(12) United States Patent
Sörvik

(10) Patent No.: US 11,950,544 B2
(45) Date of Patent: Apr. 9, 2024

(54) METHOD FOR HANDLING LOGS AND LOG MARKING TOOL FOR USE IN SUCH A METHOD

(71) Applicant: Bengt Sörvik, Uppsala (SE)

(72) Inventor: Bengt Sörvik, Uppsala (SE)

( * ) Notice: Subject to any disclaimer, the term of this patent is extended or adjusted under 35 U.S.C. 154(b) by 1135 days.

(21) Appl. No.: 16/628,187

(22) PCT Filed: Jun. 20, 2018

(86) PCT No.: PCT/SE2018/050657
§ 371 (c)(1),
(2) Date: Jan. 2, 2020

(87) PCT Pub. No.: WO2019/009783
PCT Pub. Date: Jan. 10, 2019

(65) Prior Publication Data
US 2021/0144936 A1    May 20, 2021

(30) Foreign Application Priority Data

Jul. 7, 2017  (SE) .................................... 1750902-7
Oct. 3, 2017  (SE) .................................... 1751221-1

(51) Int. Cl.
*A01G 23/099*    (2006.01)
*A01G 23/08*     (2006.01)
(Continued)

(52) U.S. Cl.
CPC ............. *A01G 23/099* (2013.01); *B25D 1/02* (2013.01); *G06F 16/2272* (2019.01); *B44B 11/04* (2013.01)

(58) Field of Classification Search
CPC ...... A01G 23/00; A01G 23/08; A01G 23/099; B25D 1/02; G06F 16/2272; B44B 11/04; G06Q 10/0875; B07C 5/00
See application file for complete search history.

(56) References Cited

U.S. PATENT DOCUMENTS 7,080,577 B2    7/2006  Latschbacher et al.
8,511,570 B2    8/2013  Häkli et al.
(Continued)

FOREIGN PATENT DOCUMENTS

EP    1 982 581 A1      10/2008
SE    1500274 A1    *  12/2016
(Continued)

OTHER PUBLICATIONS

English translate (SE1500274A1), retrieved date Jul. 12, 2023.*

*Primary Examiner* — Matthew Katcoff
*Assistant Examiner* — Mohammed S. Alawadi
(74) *Attorney, Agent, or Firm* — Dilworth & Barrese, LLP

(57) ABSTRACT

A method for handling logs, wherein the method comprises the following steps: —retrieving or generating a unique code at a first moment; —establishing, by means of a position determining device, position information as to the geographical position of a portable, hand-held log marking tool (1) at said first moment; —applying the code as a corresponding code marking on a log by means of the log marking tool at a second moment and automatically establishing a time value representing the time elapsed between said first moment and said second moment; —comparing said time value with a predetermined time threshold value; and—storing the code as an authenticated code in a database associated to the position information when said time value is smaller than the time threshold value. The invention also relates to a log marking tool (1) for use in such a method.

17 Claims, 5 Drawing Sheets

(51) Int. Cl.
*B07C 5/00* (2006.01)
*B25D 1/02* (2006.01)
*B44B 11/04* (2006.01)
*G06F 16/22* (2019.01)
*G06Q 10/0875* (2023.01)

(56) References Cited

U.S. PATENT DOCUMENTS

| | | | |
|---|---|---|---|
| 2004/0244660 A1 | 12/2004 | Gabriel | |
| 2011/0126941 A1* | 6/2011 | Sorvik | A01G 23/081 |
| | | | 144/4.1 |
| 2013/0199670 A1* | 8/2013 | Sorvik | A01G 23/08 |
| | | | 144/4.1 |

FOREIGN PATENT DOCUMENTS

| | | | |
|---|---|---|---|
| WO | 95/07000 A1 | 3/1995 | |
| WO | 99/23873 A1 | 5/1999 | |
| WO | 02/13597 A1 | 2/2002 | |
| WO | 2009/151374 A1 | 12/2009 | |
| WO | WO-2009151374 A1 * | 12/2009 | A01G 23/08 |
| WO | 2011/087405 A1 | 7/2011 | |

\* cited by examiner

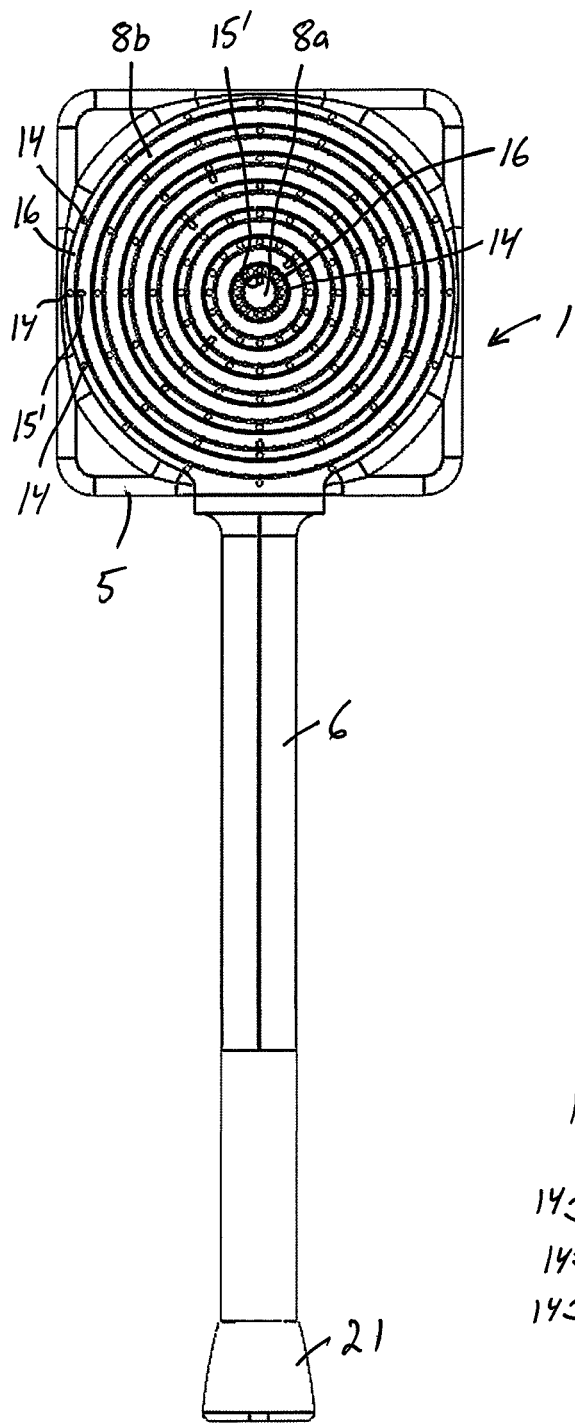
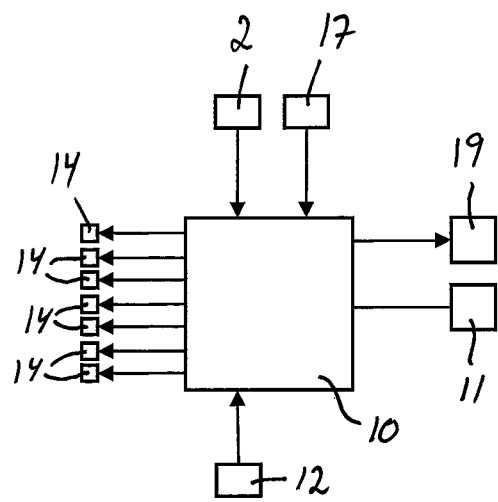
Fig 10
Fig 11

METHOD FOR HANDLING LOGS AND LOG MARKING TOOL FOR USE IN SUCH A METHOD

FIELD OF THE INVENTION AND PRIOR ART

The present invention relates to a method for handling logs, wherein a portable, hand-held log marking tool is used for applying a code marking on a log. The invention also relates to a portable, hand-held log marking tool for use in such a method.

From WO 99/23873 A1 is previously known a system enabling a rational forest harvesting. According to one aspect of this system, the forest harvesting is carried out by means of a harvesting machine comprising a vehicle and a harvesting arrangement mounted thereon, the vehicle being provided with a computer arrangement adapted to register quality and/or size concerning harvested logs. In connection with the felling of a tree, the position of the harvesting machine is determined, for instance by means of a GPS equipment, and a log obtained from the tree is marked by a marking device with a code by means of which the log is associable to the position information. The code applied on a log may be stored in a database associated with data concerning quality and/or size of the log in question. In this way, it will be possible to treat the logs as products having an identity of origin and it will thereby be possible to check that an individual log or a batch of logs is not originating from a nature reserve where felling of trees is prohibited.

However, this previously known system requires that the felling of the trees is carried out be means of a harvesting machine, which is not always the case. There is a need for a similar solution which can be used for handling logs emanating from trees which have not been felled by means of a harvesting machine or at least not by means of a harvesting machine equipped with a marking device.

It is previously known to mark individual logs with transponders (see for instance U.S. Pat. No. 8,511,570 B2) or marker tags (see for instance U.S. Pat. No. 7,080,577 B2) which are fixed to the logs by means of a hand-held striking tool.

SUMMARY OF THE INVENTION

The object of the present invention is to provide a new and favourable method for handling logs.

According to the invention, this object is achieved by a method having the features defined herein.

The method according the present invention comprises the following steps:
- retrieving or generating a unique code at a first moment;
- establishing, by means of a position determining device, position information as to the geographical position of a portable, hand-held log marking tool at said first moment;
- applying the code as a corresponding code marking on a log by means of the log marking tool at a second moment and automatically establishing a time value representing the time elapsed between said first moment and said second moment;
- comparing said time value with a predetermined time threshold value; and
- storing the code as an authenticated code in a database associated to the position information when said time value is smaller than the time threshold value.

With this method, it will be possible to establish the place of origin of a marked log by reading the code marking applied on the log. The code marking can also be utilized in order to follow the movement of the log from the felling to the final customer. An authenticated code verifies that the associated code marking was applied on the log in question within a given time interval (for instance in the order of 30-120 seconds) after the moment when the code was retrieved or generated and the position of the log marking tool was established, which implies that the log must have been in the vicinity of this position when the code marking was applied on the log by means of the log marking tool. The correctness of the position information associated with a specific code marking on a log is hereby verified.

Further advantageous features of the method according to the present invention will appear from the description following below.

The invention also relates to a log marking tool having the features defined herein in.

Further advantageous features of the log marking tool according to the present invention will appear from the description following below.

BRIEF DESCRIPTION OF THE DRAWINGS

With reference to the appended drawings, a specific description of preferred embodiments of the invention cited as examples follows below. In the drawings:

FIG. 10 is a schematic rear view of the log marking tool of FIGS. 6 and 7, and FIG. 11 is an outline diagram of parts included in a log marking tool for use in a method according to the present invention.

DETAILED DESCRIPTION OF EMBODIMENTS OF THE INVENTION

Figure 1:
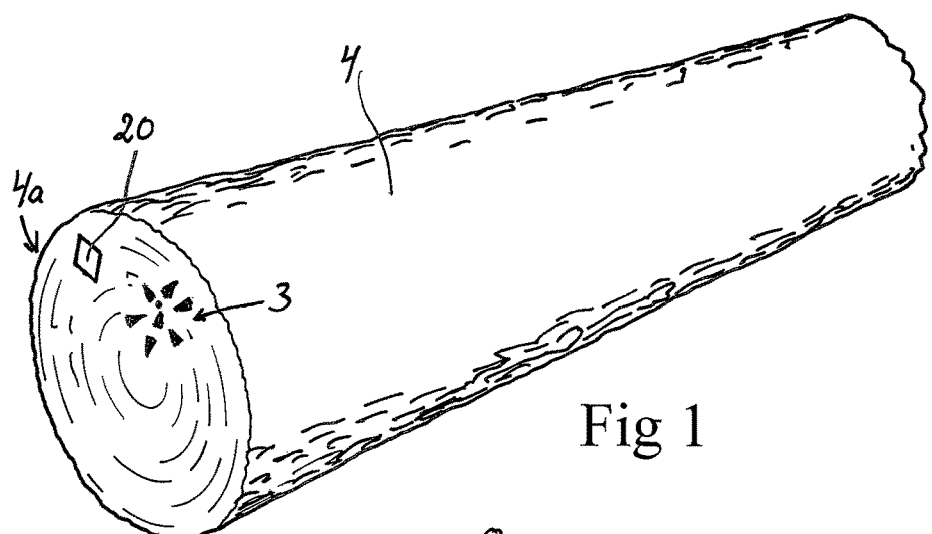
FIG. 1 is a schematic perspective view of a log marked at one end with a code marking and with an information carrier.
Figure 2:
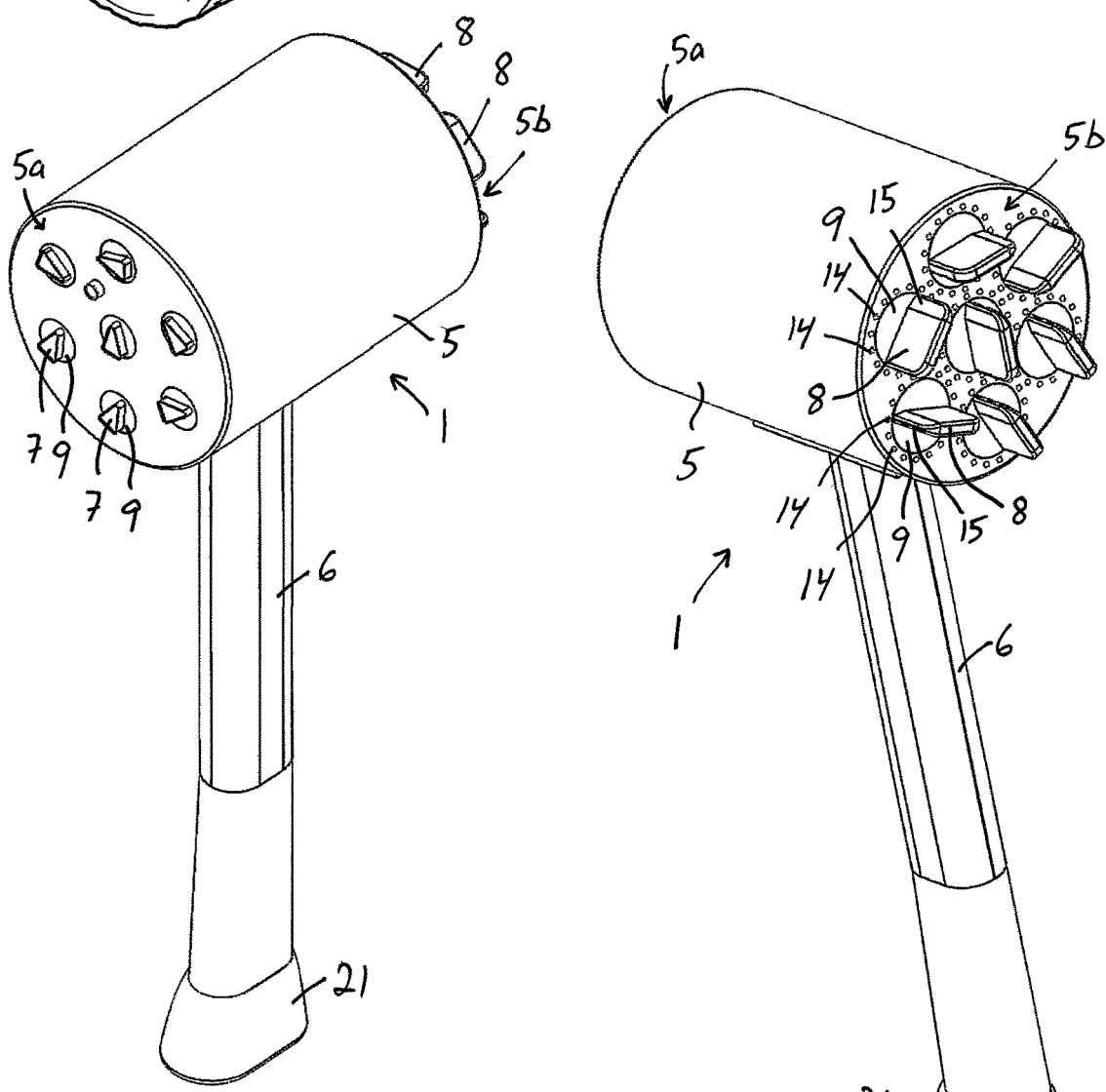
FIGS. 2 and 3 are schematic perspective views from different directions of a log marking tool according to a first embodiment for use in a method according to the present invention.
Figure 3:
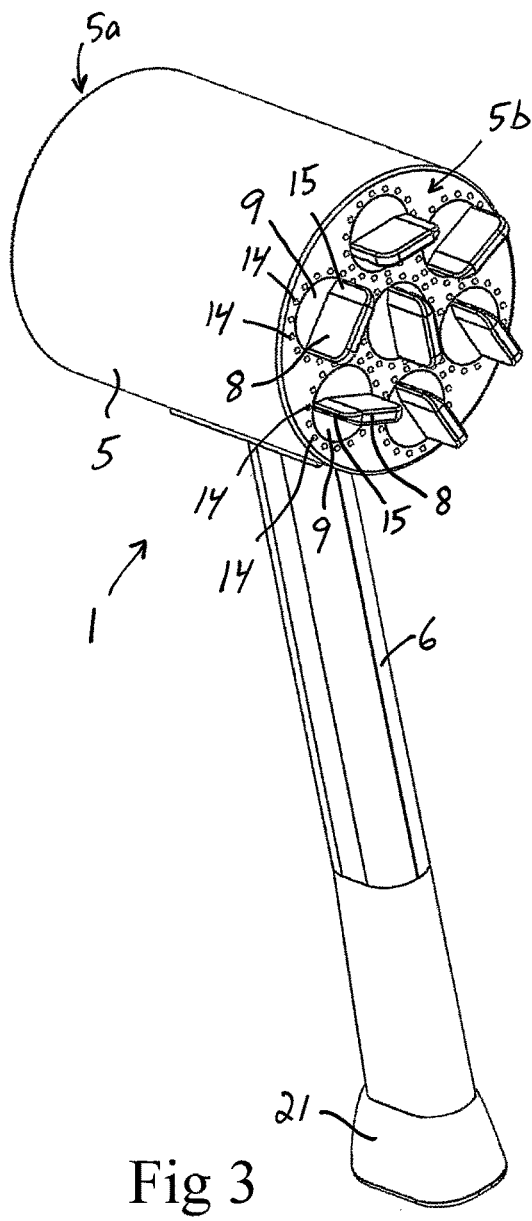
Figure 4:
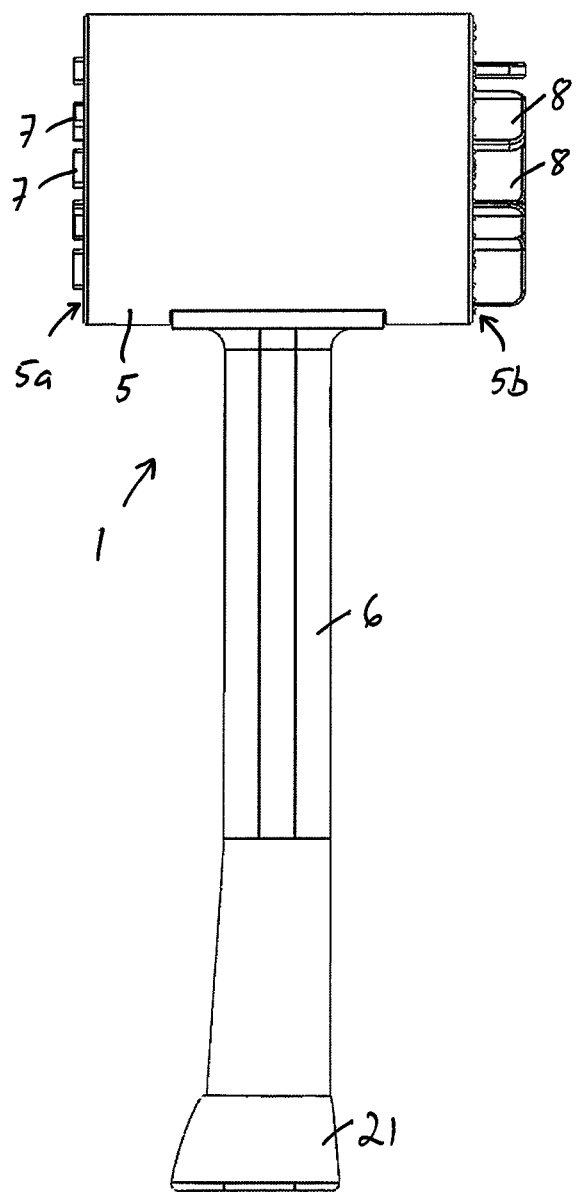
FIG. 4 is a schematic lateral view of the log marking tool of FIGS. 2 and 3.
Figure 5:
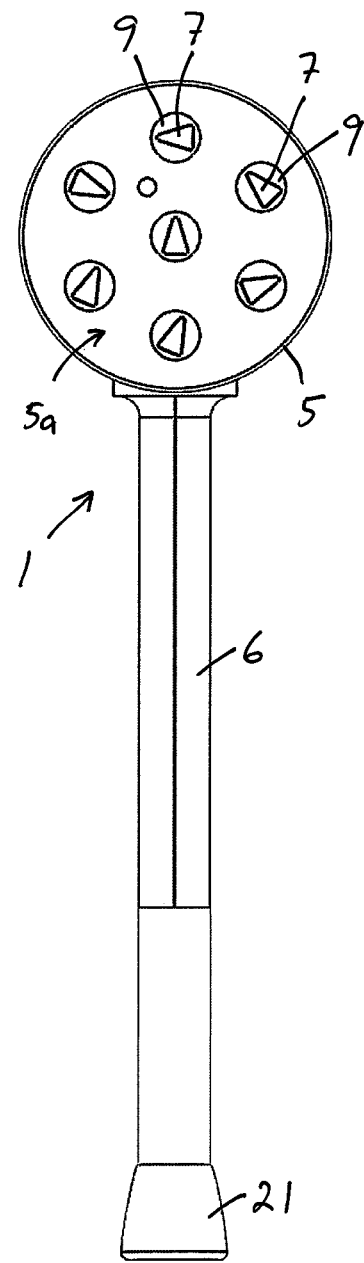
FIG. 5 is a schematic front view of the log marking tool of FIGS. 2 and 3, FIGS. 6 and 7 are schematic perspective views from different directions of a log marking tool according to a second embodiment for use in a method according to the present invention.
Figures 6, 7:
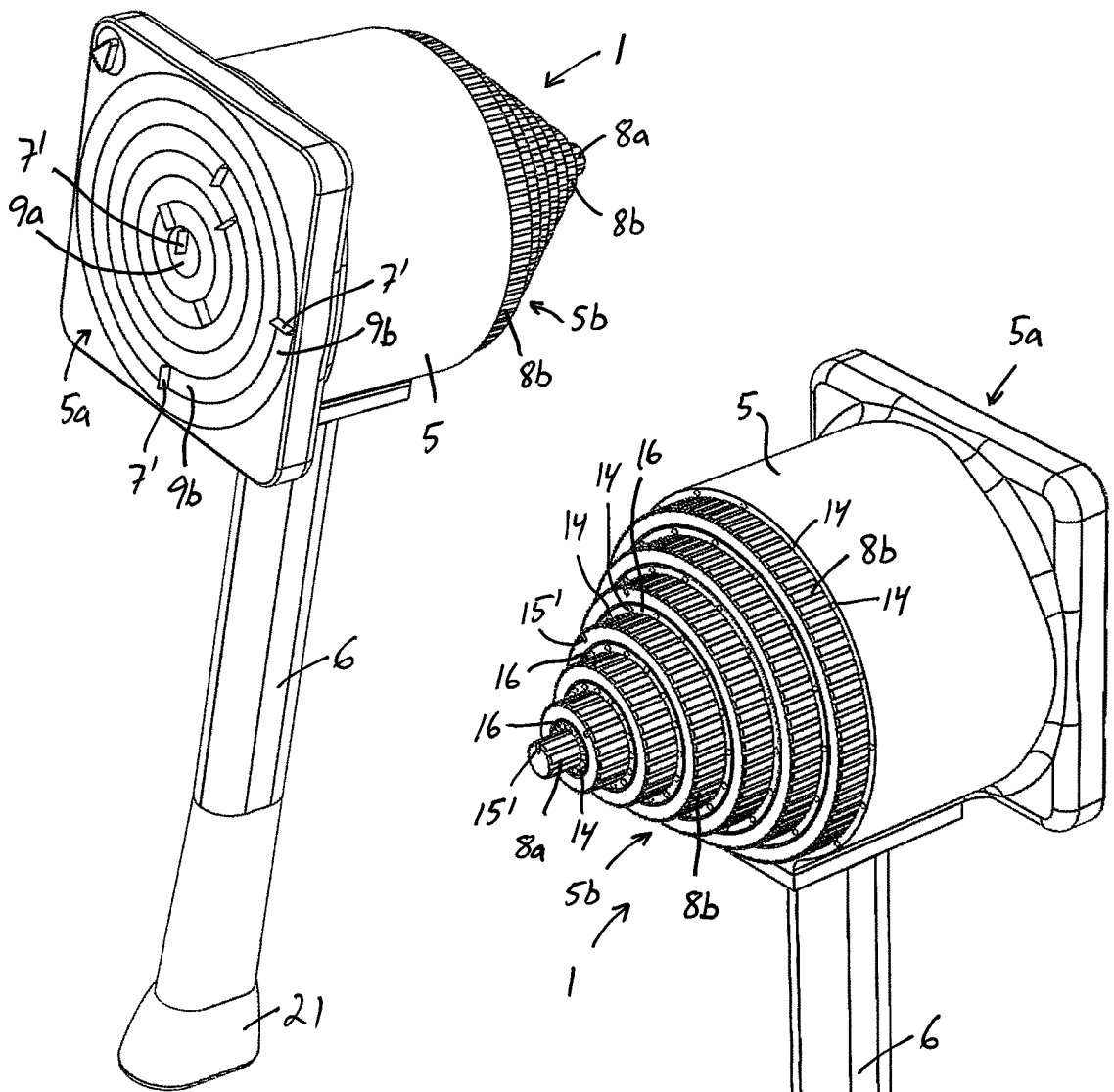
Figure 8:
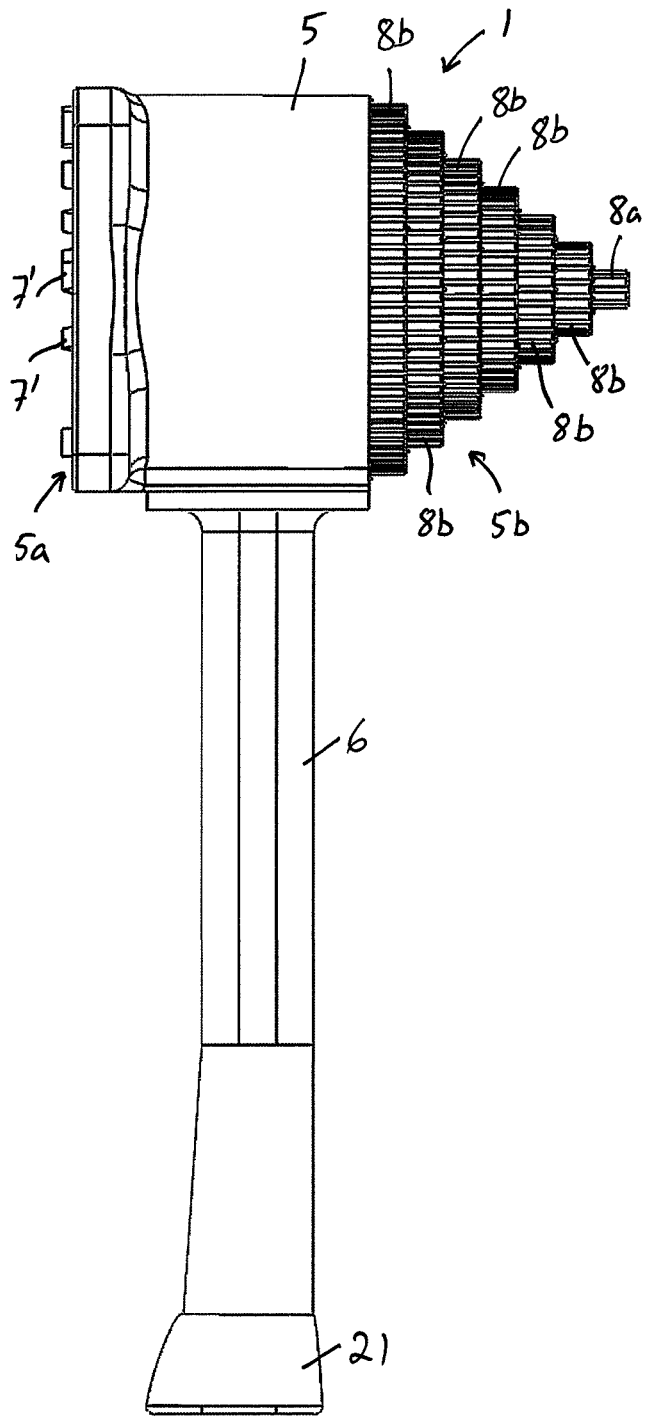
FIG. 8 is a schematic lateral view of the log marking tool of FIGS. 6 and 7.
Figure 9:
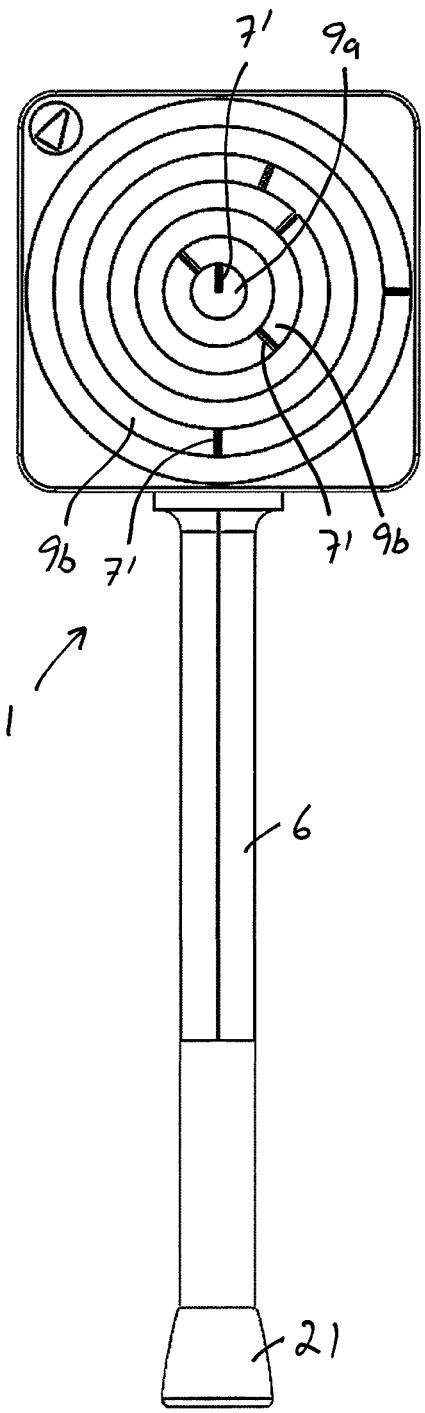
FIG. 9 is a schematic front view of the log marking tool of FIGS. 6 and 7.

The following steps are performed when applying the method according to the present invention:

- a unique code is retrieved or generated at a first moment $t_1$;
- position information as to the geographical position of a portable, hand-held log marking tool 1 at said first moment $t_1$ is established by means of a position determining device 2 (schematically illustrated in FIG. 11);
- the retrieved/generated code is applied as a corresponding code marking 3 (see FIG. 1) on a log 4 by means of the log marking tool 1 at a second moment $t_2$, and a time value $t_V$ representing the time elapsed between said first moment $t_1$ and said second moment $t_2$ is established;

said time value $t_V$ is compared with a predetermined time threshold value $t_{th}$; and the code is stored as an authenticated code in a database associated to the position information when said time value $t_V$ is smaller than the time threshold value $t_{th}$.

The code and/or the position information is preferably stored as timestamped data in said database to thereby make it possible to check, at a later moment, when a specific code or the associated position information was stored.

The time threshold value $t_{th}$ is for instance in the range of 30-120 seconds, preferably in the range of 45-90 seconds.

The code marking 3 may for instance have the form of a number combination or a pattern, or a combination thereof.

FIGS. 2-5 and FIGS. 6-10 schematically illustrate two different embodiments of a portable, hand-held log marking tool 1 adapted for use in a method according to the present invention. The log marking tool 1 is to be used for applying a unique code marking 3 on a log 4, preferably on a surface at a crosscut end 4*a* of the log.

The log marking tool 1 preferably has a unique identity in order to make it possible to distinguish different log marking tools from each other. The unique identity of the log marking tool 1 is for instance indicated in the form of an item number engraved on the log marking tool.

In the illustrated embodiments, the log marking tool 1 comprises a striking head 5 and a handle 6. The striking head 5 is fixed to the handle 6 and it is to be hit against a log 4, by a person gripping the handle 6 with one hand or two hands, in order to apply a code marking 3 on the log. The code marking 3 is achieved by means of adjustable marking elements 7, 7' arranged on a first side 5*a* of the striking head 5. Each adjustable marking element 7, 7' is connected to an associated setting member 8, 8*a*, 8*b* arranged on an opposite second side 5*b* of the striking head 5 in order to allow the positions of the adjustable marking elements 7, 7' to be manually set by means of the setting members 8, 8*a*, 8*b* and thereby allow a unique code marking 3 of a desired configuration to be achieved by means of the marking elements 7, 7'.

In the illustrated embodiments, each adjustable marking element 7, 7' is configured to apply a rotationally unsymmetrical mark on a log and is settable in different rotational positions in relation to the other adjustable marking elements 7, 7' on the striking head 5.

In the embodiment illustrated in FIGS. 2-5, each adjustable marking element 7 is rotatable about its longitudinal axis and configured to apply an arrow-shaped mark on a log. The adjustable marking elements 7 of the log marking tool 1 may of course also have any other suitable shape in order to form a rotationally unsymmetrical mark of a desired shape on a log. Each adjustable marking element 7 is fixed to a circular end surface at a first end of a holding member 9, wherein each holding member 9 is rotatably mounted to the striking head 5 and extends axially across the striking head 5 from the first side 5*a* of the striking head to the second side 5*b* of the striking head. A setting member 8 is fixed to a circular end surface at an opposite second end of each holding member 9. By rotation of a setting member 8, the associated holding member 9, and thereby also the adjustable marking element 7 at the opposite end of the holding member 9, is rotated about its longitudinal axis.

In the embodiment illustrated in FIGS. 6-10, a first adjustable marking element 7' is fixed to a circular end surface at a first end of a cylindrical holding member 9*a*. The cylindrical holding member 9*a* extends axially across the striking head 5 from the first side 5*a* of the striking head to the second side 5*b* of the striking head. A cylindrical setting member 8*a* is provided at an opposite second end of the cylindrical holding member 9*a*. Each one of the other adjustable marking elements 7' is fixed to an annular end surface at a first end of a tubular holding member 9*b*, wherein the tubular holding members 9*b* are coaxially arranged in relation to the cylindrical holding member 9*a* and in relation to each other. Each tubular holding member 9*b* extends axially across the striking head 5 from the first side 5*a* of the striking head to the second side 5*b* of the striking head. An annular setting member 8*b* is provided at an opposite second end of each tubular holding member 9*b*. The cylindrical holding member 9*a* and the tubular holding members 9*b* are rotatably mounted to the striking head 5 and they are individually rotatable in relation to each other and in relation to the striking head 5 about a common centre axis. In the illustrated example, each adjustable marking element 7' extends radially across the end surface of the associated holding member 9*a*, 9*b* and is configured to apply a linear mark on a log. By rotation of a setting member 8*a*, 8*b*, the associated holding member 9*a*, 9*b*, and thereby also the adjustable marking element 7' at the opposite end of the holding member 9*a*, 9*b*, is rotated about said centre axis.

Each adjustable marking element 7, 7' is preferably arranged to be rotated step by step with a given rotational angle between each step. In the illustrated examples, the rotational angle between each step is 22.5°. Thus, in this cases each adjustable marking element 7, 7' is settable in sixteen different rotational positions.

The adjustable marking elements 7, 7' of the log marking tools 1 illustrated in FIGS. 2-10 are arranged to apply a mark on a log 4 by stamping or punching. Thus, these marking elements 7, 7' are intended to penetrate into the surface of a log hit by the striking head 5 so as to achieve an indentation in said surface.

The log marking tool 1 comprises an electronic processing device 10 (schematically illustrated in FIG. 11), which preferably is accommodated in the handle 6 of the log marking tool. The above-mentioned unique code is with advantage electronically retrieved or generated by means of the electronic processing device 10 of the log marking tool 1. The unique code may for instance be electronically retrieved by the electronic processing device 10 from a database comprising a set of predetermined unique codes, wherein this database is stored on a data storage medium 11, for instance in the form of a memory accommodated in the handle 6 of the log marking tool. As an alternative, the unique code may be electronically generated in a predefined manner by means of the electronic processing device 10. As a further alternative, the unique code may be electronically retrieved or generated by means of an external electronic processing device, which in its turn is configured to transmit the code to the electronic processing device 10 of the log marking tool 1 through a wireless connection.

The unique code is preferably retrieved or generated in a randomized manner, to thereby make it impossible for the user of the log marking tool 1 to predict the next unique code to be retrieved or generated.

The above-mentioned position determining device 2 for establishing the prevailing geographical position of the log marking tool 1 is with advantage configured to operate according to the GPS system (GPS=Global Positioning System). However, any other suitable type of position determining device may also be used. The position determining device 2 is preferably accommodated in the handle 6 of the log marking tool 1 and connected to the electronic processing device 10. As an alternative, the geographical position of the log marking tool 1 may be established by means of an external position determining device, for instance included in a smart phone or other electronic apparatus carried by the person presently using the log marking tool, wherein position information generated by means of this external position determining device is transmitted to the electronic processing device 10 of the log marking tool 1 through a wireless connection.

A unique code is intended to be retrieved of generated when so ordered by the present user of the log marking tool 1, for instance by means of a triggering member 12 (schematically illustrated in FIG. 11) in the form of a push-button or the similar arranged on the handle 6 of the log marking tool 1. The electronic processing device 10 is preferably configured to allow a code to be retrieved or generated only on condition that the electronic processing device 10 is capable of receiving position information from the position determining device 2 as to the prevailing geographical position of the log marking tool 1.

According to a preferred embodiment, the electronic processing device 10 is configured to prevent a code from being retrieved or generated in a situation when it is established by the electronic processing device 10, based on position information from the position determining device 2, that the log marking tool 1 is presently located in a nature reserve or other area where felling of trees is prohibited.

The log marking tool 1 may be provided with actuators, for instance in the form of electric motors or pneumatically or hydraulically operated actuators, which are controlled by the electronic processing device 10 of the log marking tool and which are configured to automatically set the adjustable marking elements 7, 7' in setting positions defined by the unique code that has been retrieved or generated. As an alternative, the adjustable marking elements 7, 7' on the striking head 5 are manually set in dependence on code displaying signals or information representing the retrieved or generated code, in order to allow the marking elements 7, 7' to form a code marking corresponding to the code on a log to be marked. Such code displaying signals or information may for instance appear on a display provided on the handle 6 of the log marking tool 1. In the embodiments illustrated in FIGS. 2-10, the code displaying signals are presented by means of light emitting diodes 14 which are arranged around each setting member 8, 8a, 8b, wherein the light emitting diodes 14 represent different positions of each setting member 8, 8a, 8b and thereby different setting positions of the adjustable marking elements 7, 7' associated with the setting members. Each light emitting diode 14 represents a setting position for a specific marking element 7, 7'. In the illustrated embodiments, where each adjustable marking element 7, 7' is settable in sixteen different setting positions, each setting member 8, 8a, 8b is consequently provided with its own set of sixteen light emitting diodes 14 equally distributed around the setting member. The light emitting diodes 14 are controlled by the electronic processing device 10. When a unique code has been retrieved or generated, the electronic processing device 10 is configured to establish, based on the code, a specific setting position for each adjustable marking element 7, 7' and to switch on one light emitting diode 14 for each setting member 8, 8a, 8b, wherein the light emitting diodes 14 which have been switched on indicate the established setting positions for the marking elements 7, 7'. The user is then intended to rotate each individual setting member 8, 8a, 8b into a rotational position in which an index member 15 or index mark 15' on the setting member is positioned in front of a light emitting diode 14 that has been switched on. In the embodiment illustrated in FIGS. 6-10, the light emitting diodes 14 are arranged on sleeve-shaped support members 16 (see FIGS. 7 and 10) arranged between the setting members 8a, 8b. In the embodiment illustrated in FIGS. 2-5, each setting member 8 is provided with an index member 15 which forms a pointed end of the setting member. In the embodiment illustrated in FIGS. 6-10, each setting member 8a, 8b is provided with an index mark 15' on its rearwardly facing end surface.

The log marking tool 1 is provided with a striking detector 17 (schematically illustrated in FIG. 11), which is configured to detect a striking movement of the striking head 5. A desired code marking 3 on a log 4 is achieved by striking the striking head 5 against the log. In the method according to the present invention, the detection of an executed striking movement with the log marking tool 1 within a given time period after the retrieval or generation of a unique code is treated as an indication that the log marking tool 1 has been used within this time period in order to apply a code marking 3 on a log 4 corresponding to the code in question. The striking detector 17 preferably comprises one or more strain gauges and/or one or more accelerometers for detecting a striking movement of the striking head 5. However, the striking detector 17 may also comprise any other suitable type of sensor for detecting a striking movement of the striking head 5. The striking detector 17 and the sensors included therein may be arranged in the handle 6 of the log marking tool 1.

The electronic processing device 10 may be configured to automatically generate a new unique code when it has been established by means of the striking detector 17 that a striking movement of the striking head 5 has occurred, to thereby make sure that a new unique code is readily available when the user of the log marking tool 1 initiates a new log marking sequence.

The above-mentioned time value $t_V$, which represents the time elapsed between a first moment $t_1$ when a unique code has been retrieved or generated by the electronic processing device 10 and a second moment $t_2$ when a code marking 3 corresponding to this unique code is applied on a log 4 by means of the log marking tool 1, is established by the electronic processing device 10 based on information from the striking detector 17, wherein said first moment $t_1$ is known by the electronic processing device 10 and said second moment $t_2$ is recorded by the electronic processing device 10 as the moment when the electronic processing device 10 receives information from the striking detector 17 about a detected striking movement.

The electronic processing device 10 of the log marking tool 1 is configured to compare the established time value $t_V$ with a predetermined time threshold value $t_{th}$. If it is established by the electronic processing device 10 that the time value $t_V$ is smaller than the time threshold value $t_{th}$, the electronic processing device 10 is configured to effect that the unique code is stored as an authenticated code in a database associated to the above-mentioned position information as to the prevailing geographical position of the log marking tool 1. The electronic processing device 10 may be configured to store the unique code and the associated position information in a database on a data storage medium 11, for instance in the form of a memory, accommodated in the handle 6 of the log marking tool. As an alternative, the electronic processing device 10 of the log marking tool 1 may be configured to transmit the unique code and the associated position information to an external electronic processing device through a wireless connection, wherein the external electronic processing device is configured to store the unique code and the associated position information in a database on a data storage medium, for instance in the form of a memory.

The position determining device 2 may also be configured to establish position information as to the geographical position of the log marking tool 1 at the above-mentioned second moment $t_2$, i.e. at the moment when it was established by means of the striking detector 17 that the striking movement of the striking head 5 occurred, wherein also this position information is stored as timestamped data in a database associated to the unique code.

The electronic processing device 10 may be configured to switch off the light emitting diodes 14 when is has been established by means of the striking detector 17 that a striking movement of the striking head 5 has occurred. The electronic processing device 10 may also be configured to switch off the light emitting diodes 14 when they have been switched on for a given period of time.

Data characteristic for a marked log 4 is with advantage stored in the database containing the authenticated code or in another database, wherein the characteristic data is stored associated to the authenticated code. Information related to a marked log 4 can hereby be retrieved in connection with a later reading of the code marking 3 on the log. The characteristic data for the log 4 may for instance include data related to the diameter and length of the log and/or other data related to the size and quality of the log, such as the type of tree. The characteristic data for the log 4 may be established by means of electronic equipment mounted to the log marking tool 1, for instance in the form of a camera and/or a laser device, or by means of external equipment. In the latter case, the characteristic data may be transmitted to the electronic processing device 10 of the log marking tool 1 through a wireless connection or cable connection or manually input by means of a touch screen or other type of input device mounted to or connected to the log marking tool 1.

As an alternative to or in addition to the storing of characteristic data of the above-mentioned type, one or more digital images of the log 4 and/or one or more digital images of the stump belonging to the tree from which the log has been obtained may be stored in the database containing the authenticated code or in another database, wherein the images are stored associated to the authenticated code. The images may be taken by means of a digital camera mounted to the log marking tool 1 or by means of an external digital camera. In the latter case, the digital images may be transmitted to the electronic processing device 10 of the log marking tool 1 through a wireless connection or cable connection.

A storing of the above-mentioned characteristic data and/or the above-mentioned images is preferably only authorized within a predetermined period of time before and/or after said first or second moment, i.e. within a predetermined period of time before and/or after the moment $t_1$ when the unique code is retrieved/generated or within a predetermined period of time before and/or after the moment $t_2$ when the corresponding code marking 3 is applied on the log 4 by means of the log marking tool 1.

The electronic processing device 10 may be configured to store the above-mentioned characteristic data and/or the above-mentioned images in a database on a data storage medium 11, for instance in the form of a memory, accommodated in the handle 6 of the log marking tool. As an alternative, the data and/or images in question may be stored in a database on a data storage medium, for instance in the form of a memory, arranged in another electronic apparatus, for instance in an external computer arrangement.

According to a preferred embodiment of the invention, position information as to the prevailing geographical position of the log marking tool 1 is continuously or repeatedly established by means of the position determining device 2 during a working period and stored as timestamped tracking data for the log marking tool 1 in a database. Hereby, it will be possible afterwards to follow the movement of the log marking tool 1 and to establish in which geographical area the log marking tool was used at a specific point of time. The stored tracking data may for instance be compared with the position information that is stored associated to the authenticated codes, to thereby verify the accuracy of this stored position information. The electronic processing device 10 may be configured to store the tracking data in a database on a data storage medium 11, for instance in the form of a memory, accommodated in the handle 6 of the log marking tool. As an alternative, the tracking data may be stored in a database on a data storage medium, for instance in the form of a memory, arranged in another electronic apparatus, for instance in an external computer arrangement.

A user of the log marking tool 1 is preferably required to identify himself/herself biometrically or by inputting a personal identification code at the start of a working period, wherein identification data for the user is stored in the database containing the authenticated code or in another database, wherein the identification data is stored associated to the authenticated code. Hereby, it will be possible to prevent an unauthorized person from using the log marking tool 1 and/or to check afterwards the identity of the person who effected the marking of a specific log.

The log marking tool 1 may comprise a communication unit 19 (schematically illustrated in FIG. 11) for wireless transmission of data stored in the database on the data storage medium 11 of the log marking tool 1 to a computer arrangement (not shown). The communication unit 19 may comprise a radio transceiver for communicating with the computer arrangement. It is of course also possible to use any other suitable technique for the wireless communication between the communication unit 19 and the computer arrangement. The operation of the communication unit 19 is controlled by the electronic processing device 10. As an alternative to wireless transmission, the transfer of data from the database on the data storage medium 11 to a computer arrangement could take place via a cable, wherein the log marking tool 1 is temporarily connected to the computer arrangement when a transfer of stored data is to take place.

Input and writing of data in the data storage medium 11 is controlled by the electronic processing device 10. The data storage medium 11 is for instance a memory of the type ROM, PROM, EPROM or EEPROM. The electronic processing device is also responsible for the control of other components included in the log marking tool 1.

The electronic processing device 10 and other sensitive electronic components of the log marking tool 1 are preferably accommodated in a watertight unit, which is mounted in an internal space of the handle 6 in a shock absorbing manner.

The log marking tool 1 also comprises a power supply unit 21, which is responsible for the supply of electric current to the position determining device 2, the electronic processing device 10, the data storage medium 11, the light emitting diodes 14, the striking detector 17, the communication unit 19 and any other possible component of the log marking tool 1 that requires supply of electric current. The power supply unit 21 is mounted to the handle 6 of the log marking tool 1 and may for instance consist of a lithium battery or the similar. The power supply unit 21 preferably has the form of a rechargeable battery and it may be detachably mounted to the handle 6.

In addition to the application of the above-mentioned code marking 3 on a log 4, an information carrier 20 (schematically illustrated in FIG. 1) could also be attached to the marked log 4. Such an information carrier could be provided with a code marking and/or any other desired information and could for instance consist of a marker tag or label with a printed code marking and/or printed information, or an RFID-tag (RFID=Radio-frequency identification), for instance in the form of a transponder or an electronic chip. The striking head 5 of the log marking tool 1 may also be provided with a marking member in the form of a valve which is designed to emit paint or ink when the striking head 5 hits against the surface of a log 4 so as to thereby apply a dot of paint or ink on the surface of the log.

The invention is of course not in any way restricted to the embodiments described above. On the contrary, many possibilities to modifications thereof will be apparent to a person with ordinary skill in the art without departing from the basic idea of the invention such as defined in the appended claims.

The invention claimed is:

1. A method for handling logs, comprising the following steps:
   retrieving or generating a code at a first moment (t1);
   establishing, by a position determining device (2), a position information of the geographical position of a portable hand-held log marking tool (1) at said first moment (t1);
   applying the code as a corresponding code marking (3) on a log (4) by the portable hand-held log marking tool (1) at a second moment (t2) and automatically establishing a time value (tV) representing the time elapsed between said first moment (t1) and said second moment (t2);
   comparing said time value (tV) with a predetermined time threshold value (tth); and
   storing the code as an authenticated code in a database associated to the position information when said time value (tV) is smaller than the predetermined time threshold value (tth).

2. The method according to claim 1, wherein the code and/or the position information are/is stored as timestamped data.

3. The method according to claim 1, wherein the portable hand-held log marking tool (1) with a striking head (5) is used for applying the code marking (3) on the log (4), and the code marking is applied on the log by striking the striking head (5) against the log.

4. The method according to claim 3, wherein adjustable marking elements (7; 7') on the striking head (5) are manually set in dependence on code displaying signals or information representing the retrieved or generated code, to allow the marking elements (7; 7') to form on the log (4) the code marking (3) corresponding to the code.

5. The method according to claim 4, wherein the marking elements (7; 7') are arranged on a first side of the striking head (5), and each adjustable marking element (7; 7') is manually set by an associated setting member (8; 8a, 8b) arranged on an opposite second side of the striking head (5).

6. The method according to claim 5, wherein said code displaying signals are presented by light emitting diodes (14) which are arranged around each setting member (8; 8a, 8b), and the light emitting diodes (14) represent different positions of each setting member (8; 8a, 8b) and thereby different setting positions of the adjustable marking elements (7; 7') associated with the setting members (8; 8a, 8b).

7. The method according to claim 3, wherein said time value (tV) is established based on information from a striking detector (17) which is included in the portable hand-held log marking tool (1) and detects a striking movement of the striking head (5).

8. The method according to claim 7, wherein the striking detector (17) detects a striking movement of the striking head (5) by one or more strain gauges and/or accelerometers.

9. The method according to claim 3, wherein the code marking is applied on the log by striking the striking head (5) against a surface on a crosscut end of the log.

10. The method according to claim 1, wherein the position information of the geographical position of the portable hand-held log marking tool (1) is continuously or repeatedly established by the position determining device (2) during a working period and stored as timestamped tracking data for the portable hand-held log marking tool (1) in a database.

11. The method according to claim 1, wherein the predetermined time threshold value (tth) is in the range of 30-120 seconds.

12. The method according to claim 11, wherein the predetermined time threshold value (tth) is in the range of 45-90 seconds.

13. The method according to claim 1, wherein data characteristic for the log (4) and/or one or more images of the log (4) and/or one or more images of a stump belonging to a tree from which the log has been obtained, is/are stored in a database associated to the authenticated code.

14. The method according to claim 13, wherein a storing of said characteristic data and/or said image or images is only authorized within a predetermined period of time before and/or after said first or second moment.

15. The method according to claim 1, wherein a user of the portable hand-held log marking tool (1) is required to identify himself/herself biometrically or by inputting a personal identification code at the start of a working period, and identification data for the user is stored in a database associated to the authenticated code.

16. The method according to claim 1, wherein the position determining device (2) is included in the portable, hand-held log marking tool (1).

17. The portable hand-held log marking tool for use in the method according to claim 1, wherein
   the portable hand-held log marking tool (1) comprises a striking head (5),
   adjustable marking elements (7; 7') are arranged on a first side of the striking head (5), and
   each adjustable marking element (7; 7') is connected to an associated setting member (8; 8a, 8b) arranged on an opposite second side of the striking head (5) to allow positions of the adjustable marking elements (7; 7') to be manually set by the setting members (8; 8a, 8b).

* * * * *